United States Patent
Nagel

[15] 3,678,614
[45] July 25, 1972

[54] TOY COMPUTER CAPABLE OF LIMITED COMPUTATION AND SIMULATING LARGE COMPUTER

[72] Inventor: Norman Eugene Nagel, 6412 Weber Circle, Huntington Beach, Calif. 92647

[22] Filed: Dec. 7, 1970

[21] Appl. No.: 95,776

[52] U.S. Cl. .............................. 46/39, 35/31 C, 46/228, 235/60 R, 235/145 R
[51] Int. Cl. .............................................. A63h 33/30
[58] Field of Search .................. 46/228; 235/60 R, 145 R; 35/9 E, 31 C, 31 R

[56] References Cited

UNITED STATES PATENTS

| | | | |
|---|---|---|---|
| 2,842,871 | 7/1958 | Laird | 35/31 R |
| 2,966,747 | 1/1961 | Johnson | 35/9 E |
| 3,498,534 | 3/1970 | Ford | 235/60 R |
| 1,081,815 | 12/1913 | De La Rosa | 35/31 R |

FOREIGN PATENTS OR APPLICATIONS 138,556  9/1950  Australia ................................... 35/32

Primary Examiner—F. Barry Shay

[57] ABSTRACT

A toy computer is presented which contains a keyboard providing for input and operation with two numbers or characters, simulates the internal computation like a real computer by a series of flashing lights, and produces the answer at one location on a panel. The two characters are input by depressing two keys, but the answer is not produced until a compute knob is turned, and a short cycle of flashing lights has occurred.

3 Claims, 5 Drawing Figures

Patented July 25, 1972

INVENTOR
Norman E. Nagel

Patented July 25, 1972

INVENTOR
Norman E. Nagel

TOY COMPUTER CAPABLE OF LIMITED COMPUTATION AND SIMULATING LARGE COMPUTER

SUMMARY OF THE INVENTION

The present invention is a toy computer designed for the entertainment of young scientifically oriented people, although older people may enjoy its simulated characteristics of a real computer. Its function is to perform an operation with two numbers or characters, simulate the internal computation like a real computer by a series of flashing lights, and produce the answer at one location on a panel. It has a capability of 100 combinations, and any one model will be restricted to one type of operation such as multiplication or addition, etc.

The toy computer comprising the present invention is an improvement over the Kiddie Komputer which is made in Hong Kong and is sold in the United States by Polyware Toy Parties, Covina, California. The Kiddie Komputer is able to multiply and add, and indirectly divide and subtract, any pair of numbers between one and 10. Its operation consists of turning a large circular disk consisting of the number to be operated upon, and depressing a button of the number to be operated by. The answer immediately lights up somewhere on a 1¼ by 2½ inch window. All answers do not appear at the same location. Applicant's improvement resides in the additional feature of simulation of internal computation of a real computer by flashing of lights, and also the display of all answers at one window location.

It is therefore an object of this invention to provide for an improved toy computer which more closely simulates a real computer.

This object will become more apparent as a description of this invention proceeds, now having reference to the drawings, wherein:

DESCRIPTION OF THE PRESENT EMBODIMENT

Figure 1:
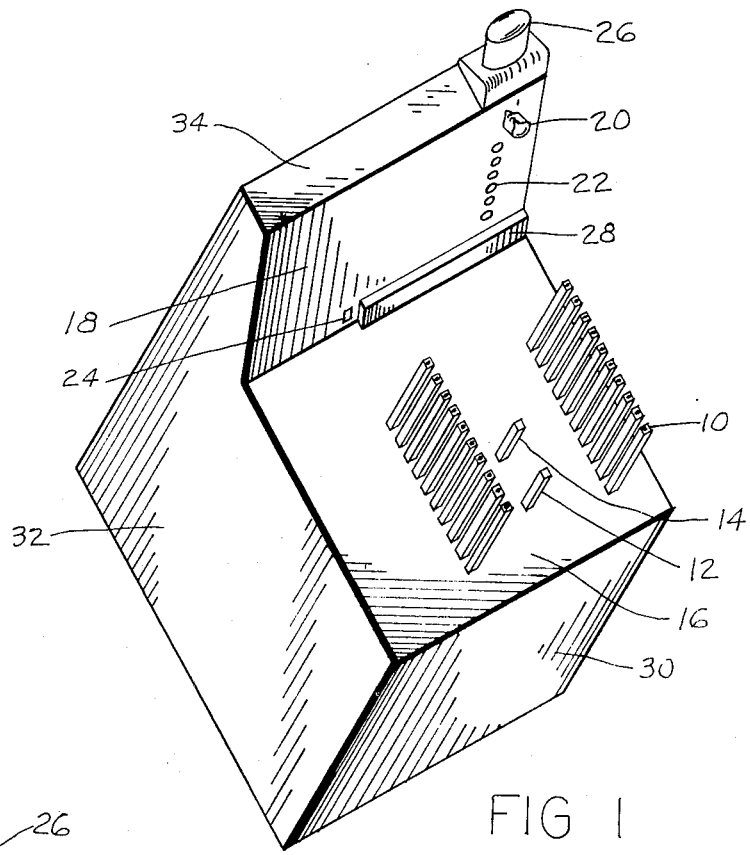
FIG. 1 is a perspective view of the toy computer in its assembled from except for words and numbers along side the keys.

Referring to FIG. 1 the keyboard has a total of 22 keys, 20 being numbers 10, one an operator key, such as a multiply key 12, and one release key 14. The keys move in square holes in the keyboard 16. Key identification goes on the keyboard next to the keys. The computer panel 18 is tilted back from the vertical, and it contains the compute knob 20, the six circular windows 22 for the flashing lights, and the square window 24 at which the answer appears. More dummy windows and knobs may be added to fill in the vacant area. A wind-up knob 26 is located at the top of the computer, and its purpose is to rotate the light oscillator cylinder and release the shield from in front of the answer member as will be described later. The outside of channel 28 can be seen. This channel is required for the horizontal movement of the answer plate as described later. The front cover 30, left side cover 32, and the top cover 34 are also shown in FIG. 1. The operation of the computer consists of pressing four keys and turning the compute knob. The four keys consist of the release key 14, two keys representing two numbers to be multiplied 10, and the multiply key 12. The multiply key is not actually required for the operation, but is included for reality. After 1 revolution of the light oscillator cylinder, the answer appears at the answer window.

Figure 2:
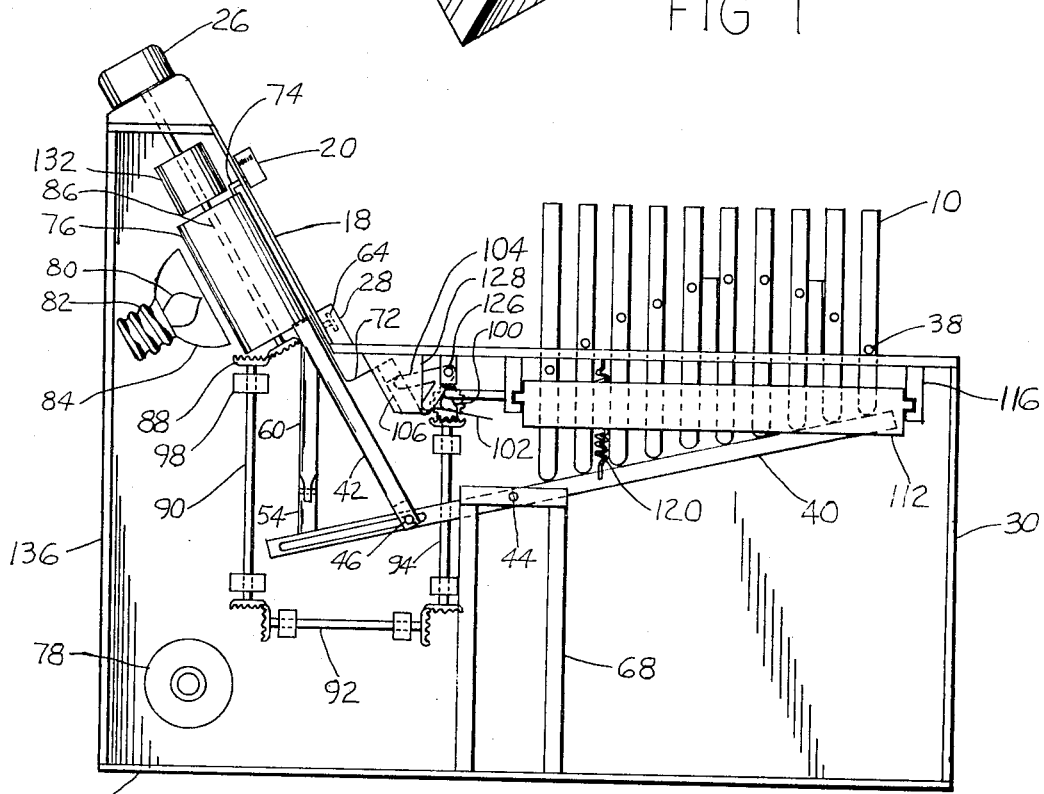
FIG. 2 is a left side view with the left cover removed.
Figures 3, 4, 5:
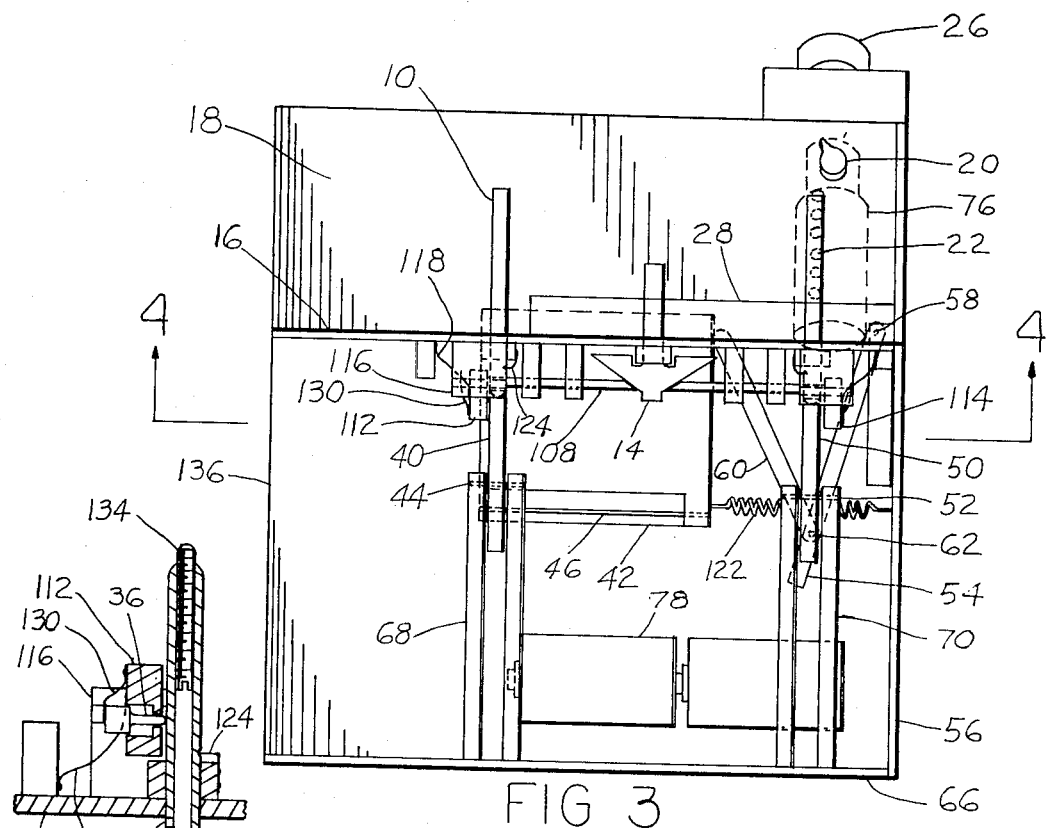
FIG. 3 is a front view with the left and front covers removed.
FIG. 4 is a view looking at the underside of the keyboard as indicated by section 4—4 of FIG. 3.
FIG. 5 is a cross sectional view through one of the keys as indicated by section 5—5 in FIG. 4.

FIG. 2 shows a left side view with the left cover 32 removed. One of the keys 10 in the left row is depressed until stop pin 36 as shown in FIG. 5 engages in hole 38 on the side of the key as shown in FIG. 2. The key is retained in this position until the release key 14 is depressed. Whatever left key 10 is depressed moves bar 40 a certain distance such that the answer member, answer plate 42 in the drawing, is moved upward along the inside of computer panel 18 until the proper row of numbers where the number is contained is even with answer window 24. The answer plate support guide is omitted for clarity. The answer plate has 10 rows and 10 columns of permanent characters or numbers printed on it. Bar 40 pivots about pin 44. Pin 46 at the bottom of the answer plate slides in a slot in bar 40.

The multiply key 12 is depressed next. This does nothing and is returned immediately to the up position by cantilever spring 48 as shown in FIG. 4.

Next, one of the keys 10 in the right row is depressed until stop pin 36 engages in the hole 38 on the side of the key. The key is retained in this position until release key 14 is depressed. Whatever key is depressed moves bar 50, which is hidden by bar 40 in FIG. 2. Bar 50 pivots on pin 52 and bears against the bottom side of link 54. Link 54 is pinned to right side cover 56 by pin 58 and is connected to link 60 near its other end as shown in FIG. 3. Link 60 fits into a slot in link 54 and the two links are pinned together by pin 62 as shown in FIG. 3. The other end of link 60 is connected to slider pin 64 shown in FIG. 2. The slider pin slides in channel 28. This scissors type of arrangement of the links produces horizontal movement of answer plate 42 until the proper column of numbers where the answer is contained is even with the answer window. Bars 40 and 50, which pivot on pins 44 and 52 respectively, are supported from the bottom cover 66 by standoffs 68 and 70 respectively.

At this point the answer is already produced at answer window 24 as shown in FIG. 1, but it is still blocked from view by window cover 72 as shown in FIG. 2. Compute knob 20 is turned clockwise to the compute position. This releases stop catch 74 from its engaged position in light oscillator cylinder 76. At the same time, stop catch 74 closes contact to an electrical circuit with two batteries 78 and bulb 80. Bulb 80, bulb socket 82, and reflector 84 may be standard flashlight parts. Socket support holder is not shown for clarity.

Cylinder 76 is now free to rotate, and torsion spring 132 rotates the cylinder about a center shaft 86. Torsion spring 132 must be wound occasionally by wind-knob 26. Cylinder 76 has 12 holes through it perpendicular to its centerline but passing through the cylinder slightly to one side of the centerline. Two sets of six holes are made, each set being 180° apart. In each set, each hole is spaced 30° apart around the circumference, and spaced apart in the lengthwise direction along the cylinder such that they line up with the six windows 22 as shown in FIG. 1. Unless a hole through the cylinder lines up with a window, no light is visable at the window. As the twelve holes line up in sequence, however, a short duration flash of light appears at each window in sequence, one at a time. The light flash starts at the top hole and works down to the bottom hole. The light flash then starts back at the top hole for the second time and again works down to the bottom hole. A yellow or amber colored window can be used to give the appearance of flashing bulbs in a computer.

This completes one revolution of cylinder 76. Stop catch 74 drops back into its engaged position in cylinder 76 which stops the cylinder, breaks contact with the electrical circuit, and brings compute knob 20 back to the left position. During the 1 revolution of cylinder, the eight gears 88 also turn 1 revolution. They are all the same diameter and are attached to shafts 90, 92, and 94 as shown in FIG. 2 and shaft 96 as shown in FIG. 4. The shafts turn in bearings 98. Near completion of 1 revolution of cylinder 76, cam 100 forces window cover catch 102 downward. This releases lever 104 and allows slide block 106, with window cover 72 attached, to slide down revealing the answer at answer window 24.

This completes the operation. When the answer to a new set of numbers is desired, release key 14 is depressed. The portion of this key under the top cover has three wedge surfaces on three sides as shown in FIGS. 3 and 4. Turning to FIG. 4, as the key is depressed, the wedge surfaces bear against the two push rods 108 pushing outward toward the sides, and push rod 110 pushing toward the rear. Push rods 108 force left stop pin bar 112 and right stop pin bar 114 outward. The bars slide along guides 116 and at the same time build up spring energy in cantilever springs 118.

Turning to FIG. 5, when bars 112 and 114 are forced out far enough, stop pin 36 is disengaged from holes 38 in the two keys that were previously depressed. Since the keys are now free, spring 120, shown in FIG. 2, pulls bar 40 up and forces the left key up. Likewise, spring 122, as shown in FIG. 3, pulls answer plate 42 to the right forcing link 60 and link 54 to close and thereby forcing bar 50 to push the right key up.

When the keys 10 are all the way up, cantilever springs 124, shown in FIG. 5, slip into a small recess in the side of each key, thereby retaining the key in the upper position.

The depressed release key 14 also forces pushrod 110 to the rear forcing one leg of lever 104 over the hump of window cover catch 102 as shown in FIGS. 2 and 4. Lever 104 pivots about pin 126 and the other leg of the lever pushes slide block 106 upward in guide 128. Window cover 72 is attached to the slide block, and it is moved upward between the front of answer plate 42 and the back of computer panel 18 to completely cover answer window 24. Spring catch 102 retains the cover in the up position.

When release key 14 is let free, springs 118 return bars 112 and 114 toward each other, and the two push rods 108 force the release key to its up position. Bar 112 and bar 114 each contain ten stop pins 36 and ten cantilever springs 130, as shown in FIG. 5. Springs 130 force stop pins 36 to bear against the side of keys 10. The computer is now ready for a new pair of numbers.

One final adjustment process is necessary. Answer plate 42 must be adjusted so that when each key 10 is depressed, the proper row and column respectively is accurately centered in the answer window 24. This is accomplished by depressing the twenty keys, one at a time, and using a small screwdriver in the access hole in the center of each key. Set screw 134 as shown in FIG. 5 is turned either way to raise or lower bars 40 and 50 until the proper answer is centered in the window. The answer plate is supported and restrained to move along the back of the inclined computer panel 18 by a guide structure which is not shown for clarity but is attached to rear cover 136 and keyboard 16.

The majority of the computer can be made from plastic or wood. The helical springs and the flat cantilever sheet springs require spring steel. The light oscillator cylinder maybe replaced by a series of small bulbs located at each window which can be made to light at random by a rotating contact. Bar and link mechanisms may be altered somewhat for the most efficient method of moving the answer plate.

Having thus described a preferred embodiment of the invention, it is to be understood that other modifications and variations will readily occur to those skilled in the art and it is to be understood that these deviations from the embodiment just described are intended to be part of this invention as defined by the appended claims.

What is claimed is:

1. A toy computer for performing a mathematical operation with two characters, said computer comprising a housing, an answer window on said housing, an answer member movably mounted in said housing, a keyboard comprising first and second groups of keys movably mounted on said housing and representing, respectively, first and second sets of characters, said answer member having a surface bearing thereon, in a fixed orderly array, representations of all solutions that can result from performing said mathematical operation with any two characters selected one from each said set, means connected to said answer member and to each said key for moving said answer member in response to movement of said keys whereby sequential actuation of two keys, one of each said group, produces sequential movements of said answer member to align with said answer window the solution representation corresponding to said two keys.

2. A toy computer as in claim 1 for simulating a real computer by means of flashing lights, said computer comprising a compute knob on said housing, a row of windows on said housing, a torsion spring wound light oscillating cylinder mounted in said housing behind said row of windows and operatively connected to said compute knob, a battery powered bulb mounted in said housing behind said light oscillating cylinder, a rotatable cam mounted in said housing, an answer window cover slidably mounted over said answer window in said housing, said cylinder having off centered longitudinally spaced holes through it perpendicular to its axis and angularly spaced around the cylinder, said holes being in line one at a time with the row of windows on computer housing upon respective orientation of cylinder, whereby actuation of said compute knob allows rotation of said light oscillating cylinder thereby producing flashes of light in sequence at each window as the cylinder rotates through one revolution, means operatively connecting said cylinder to said cam for rotating said cam for effecting the release of said answer window cover from in front of said answer window.

3. A toy computer as claimed in claim 1, including a series of windows in said housing and a series of small bulbs located at said windows and means including a rotating contact for causing said bulbs to light at random thereby simulating a real computer.

* * * * *